United States Patent
Winkler et al.

(10) Patent No.: US 9,126,481 B2
(45) Date of Patent: Sep. 8, 2015

(54) METHOD FOR OPERATING A MOTOR VEHICLE IN TRAILING THROTTLE MODE

(75) Inventors: Josef Winkler, Kipfenberg (DE); Rainer Ertel, Fürth (DE); Gerhard Hinkel, Happurg (DE); Lars Nitz, Nürnberg (DE); Bernd Schafer, Nürnberg (DE)

(73) Assignees: AUDI AG, Ingolstadt (DE); CONTI TEMIC MICROELECTRONIC GMBH, Nürnberg (DE)

( * ) Notice: Subject to any disclaimer, the term of this patent is extended or adjusted under 35 U.S.C. 154(b) by 0 days.

(21) Appl. No.: 14/112,665

(22) PCT Filed: Sep. 17, 2011

(86) PCT No.: PCT/EP2011/004666
§ 371 (c)(1),
(2), (4) Date: Dec. 20, 2013

(87) PCT Pub. No.: WO2012/143022
PCT Pub. Date: Oct. 26, 2012

(65) Prior Publication Data
US 2014/0200783 A1 Jul. 17, 2014

(30) Foreign Application Priority Data
Apr. 20, 2011 (DE) .......................... 10 2011 018 325

(51) Int. Cl.
| B60K 26/00 | (2006.01) |
| F16D 48/06 | (2006.01) |
| F16H 59/42 | (2006.01) |
| F16H 61/688 | (2006.01) |
| F16H 59/18 | (2006.01) |

(52) U.S. Cl.
CPC ............. *B60K 26/00* (2013.01); *F16D 48/06* (2013.01); *B60W 2710/025* (2013.01); *F16D 2500/3067* (2013.01); *F16D 2500/5048* (2013.01); *F16D 2500/5085* (2013.01); *F16D 2500/50825* (2013.01); *F16H 59/42* (2013.01); *F16H 61/688* (2013.01); *F16H 2059/186* (2013.01)

(58) Field of Classification Search
None
See application file for complete search history.

(56) References Cited

U.S. PATENT DOCUMENTS

| 4,944,199 A | | 7/1990 | Okino et al. |
| 5,480,363 A | * | 1/1996 | Matsubara et al. ............. 477/63 |

(Continued)

FOREIGN PATENT DOCUMENTS

| DE | 197 18 466 A1 | 11/1997 |
| DE | 198 50 549 A1 | 5/2000 |

(Continued)

OTHER PUBLICATIONS

Copy of International Search Report issued by the European Patent Office in International Application PCT/EP2011/004666 on Dec. 27, 2011.

*Primary Examiner* — John R Olszewski
*Assistant Examiner* — Jess Whittington
(74) *Attorney, Agent, or Firm* — Henry M. Feiereisen LLC

(57) ABSTRACT

In a motor vehicle with an adjustable coupling (intermediate device) between the (crank)shaft and floor contact elements (wheels), wherein the coupling is set in trailing throttle mode in such a way that the rotational speed of the shaft is reduced, in particular is adjusted to a predefined value, in order to reduce the internal losses of the drive, in particular an internal combustion engine.

12 Claims, 2 Drawing Sheets

(56) References Cited

U.S. PATENT DOCUMENTS

| | | | |
|---|---|---|---|
| 5,651,752 A * | 7/1997 | Wakahara et al. | 477/181 |
| 5,979,402 A * | 11/1999 | Melbourne | 123/339.16 |
| 6,049,752 A | 4/2000 | Katakura et al. | |
| 6,376,927 B1 * | 4/2002 | Tamai et al. | 290/40 C |
| 6,712,734 B1 | 3/2004 | Loeffler | |
| 8,177,685 B2 | 5/2012 | Leibbrandt et al. | |
| 2005/0166693 A1 | 8/2005 | Lauri et al. | |
| 2007/0225114 A1 * | 9/2007 | Rzepecki et al. | 477/107 |
| 2008/0133097 A1 * | 6/2008 | Schneider et al. | 701/53 |
| 2010/0131160 A1 * | 5/2010 | Ayabe et al. | 701/54 |
| 2010/0216596 A1 * | 8/2010 | Kaltenbach | 477/118 |
| 2012/0046841 A1 * | 2/2012 | Wurthner et al. | 701/54 |
| 2012/0074775 A1 | 3/2012 | Winkler et al. | |

FOREIGN PATENT DOCUMENTS

| | | |
|---|---|---|
| DE | 100 2 46 421 A1 | 9/2003 |
| DE | 103 08 700 A1 | 10/2003 |
| DE | 10 2004 030 198 A1 | 2/2006 |
| EP | 1 450 074 A2 | 8/2004 |
| EP | 1 450 076 A2 | 8/2004 |
| EP | 1 544 514 A2 | 6/2005 |
| EP | 2 063 152 A1 | 5/2009 |
| GB | 2 353 339 A | 2/2001 |
| JP | 2007-092814 A | 12/2007 |
| WO | WO 03/074908 A2 | 9/2003 |

\* cited by examiner

METHOD FOR OPERATING A MOTOR VEHICLE IN TRAILING THROTTLE MODE

CROSS-REFERENCES TO RELATED APPLICATIONS

This application is the U.S. National Stage of International Application No. PCT/EP2011/004666, filed Sep. 17, 2011, which designated the United States and has been published as International Publication No. WO 2012/143022 and which claims the priority of German Patent. Application, Ser. No. 10 2011 018 325.6, filed Apr. 20, 2011, pursuant to 35 U.S.C. 119(a)-(d).

BACKGROUND OF THE INVENTION

The invention relates to a method for operating a motor vehicle. A prerequisite is that the motor vehicle has a primary drive for rotating a shaft, for example an internal combustion engine with a crank shaft. The primary drive in this case is coupled with ground contact elements, in particular wheels of the motor vehicle, via an intermediate device. The intermediate device includes a clutch and as the case may be a transmission, wherein the clutch can be integrated into the transmission. A prerequisite is an adjustable intermediate device, in particular an adjustable clutch, i.e. the torque which is transferred via the intermediate device is to be changeable by varying a regulating variable (which in the example more or less directly relates to the clutch) so that a defined rotational speed of the primary drive can be set. In the example, such a clutch can be caused to assume intermediate states between a state of being decoupled and a state in which a maximal torque is transferred, the clutch is completely engaged.

It is known to detect during the drive of such a motor vehicle whether the movement of the motor vehicle occurs in coasting mode, i.e., whether the force flow proceeds from the wheels or other ground contact elements such as a chain, to the (crank)shaft and not vise versa as in the traction mode. Such a trailing throttle phase can for example be detected by way of the position of the gas pedal: in particular when the driver no longer actuates the gas pedal no active forward drive is generated any more by the primary drive (for example internal combustion engine). There is also the so called trailing throttle fuel cutoff: in trailing throttle mode the primary drive is only supplied with the kinetic energy which is inputted via the ground contact units by the clutch, in the example of a motor vehicle with internal combustion engine and transmission the fuel supply to the internal combustion engine is interrupted which saves fuel, the clutch is not engaged, the rotational speed of the crank shaft corresponds to the rotational speed on the transmission side and is thus proportional to the drive output rotational speed of the intermediate device. Small differences in rotational speed result due to a principally possible micro slip which for reasons of simplicity is disregarded in the following description. Due to the fact that the shaft of the primary drive still rotates with sufficient rotational speed an acceleration can be provided again relatively quickly when there is a corresponding demand by the driver for example via the gas pedal.

The trailing throttle fuel cutoff also involves that when exceeding a threshold value for the rotational speed of the primary drive shaft, supply with primary energy (in the case of an internal combustion engine with fuel) is initiated again in order to not allowing the rotational speed of the primary drive to become too low. At this threshold rotational speed the clutch is disengaged.

During the trailing throttle fuel cutoff the primary drive has a decelerating effect on the drive due to internal losses (for example compression in the internal combustion engine, mechanical losses etc.), wherein the kinetic energy which is inputted via the drive is predominantly converted into non-usable energy forms (for example heat). In the following, this no longer usable energy is referred to as loss energy. It would be desirable to be able to convert at least a portion of this energy into electric energy, for example via an electric machine.

As alternative to the trailing throttle fuel cutoff it is also known to disengage the clutch during trailing throttle mode and to operate the primary drive in neutral mode. This prevents that the primary drive absorbs kinetic energy. In addition, no renewed starting process is required for the primary drive in case of acceleration. A disadvantage is here the consumption of primary energy (for example fuel consumption when using an internal combustion engine as primary drive) for the neutral mode.

It is also possible to disengage the clutch during trailing throttle mode and to turn off the primary drive. As a result, neither primary energy nor kinetic energy is absorbed by the primary drive. This has the disadvantage that the primary drive has to be restarted again when accelerating.

It would thus be desirable to find a compromise so as to minimize the disadvantages of the mentioned possibilities of a trailing throttle mode.

SUMMARY OF THE INVENTION

It is thus an object of the invention to improve the energy balance when operating a motor vehicle in particular in the coasting without having to start the primary drive anew in case of an acceleration phase.

In one aspect, the object is solved by a method for operating a motor vehicle including detecting during a drive of the vehicle whether the vehicle moves in trailing throttle mode; when the vehicle moves in trailing throttle mode, automatically setting a regulating variable; and causing an intermediate device, which couples a shaft driven by the drive with ground contact elements of the motor vehicle, to assume one of multiple intermediate states between being disengaged and being fully engaged, wherein the intermediate state is commensurate with the regulating variable, thereby decreasing a rotational speed of the shaft and transferring a torque between the drive and the intermediate device as a function of the intermediate state, wherein the rotational seed of the shaft and a rotational speed of the intermediate device differ from each other in the intermediate state, and in another aspect by a motor vehicle including a drive, in particular an internal combustion engine, having a shaft; an intermediate device coupling the drive with ground contact elements of the motor vehicle; a device for varying a regulating variable regarding the intermediate device; and a device for detecting whether the motor vehicle moves in a trailing throttle mode, wherein the device for varying the regulating variable is configured to automatically lower the rotational speed of the shaft in the trailing throttle mode by varying the regulating variable, thereby causing the intermediate device to assume one of multiple intermediate states between being disengaged and being fully engaged, said intermediate state being commensurate with the regulating variable, wherein a torque transferred between the drive and the intermediate device is a function of the intermediate state, and wherein the rotational speed of the shaft and a rotational speed of the intermediate device differ from each other in the intermediate state.

In the method according to the invention, when it is detected that the motor vehicle moves in the trailing throttle mode, the rotational speed of the primary drive shaft is reduced to a value by automatically adjusting the regulating variable regarding the intermediate device, which still ensures a trailing throttle fuel cutoff.

The invention is based on the recognition that the internal losses of the primary drive depend on its shaft speed. The loss energy is in particular higher at higher rotational speeds than at lower rotational speeds, As an example a power loss can result from the energy loss of 25 kW at a rotational speed of 3000 rpm which is reduced to 6 kW at 1000 U/min.

Preferably, the rotational speed of the shaft of the primary drive is set to a predetermined value in the trailing throttle mode, in particular with open loop control, which is particularly advantageous. This value may depend on the overall strategy with which the motor vehicle is to be operated. In particular however, the predetermined value lies above a value for the rotational speed of the shaft of the primary drive at which a control device of the motor vehicle would cause the consumption of energy during trailing throttle mode. In the preferred exemplary case of an internal combustion engine this would be the rotational speed at which fuel would be injected to maintain a minimal rotational speed in order for the motor vehicle to be able to accelerate out of the trailing throttle mode as fast a possible if the driver so desires.

A motor vehicle In which the invention can be implemented particularly advantageously includes a twin clutch transmission as part of the intermediate device. The reason for this is that the difference between rotational speed of the primary drive shaft and the rotational speed of the intermediate device which is referred to as clutch slip, increases thereby resulting in an increase of the internal losses in the clutch. For reducing these internal losses, the clutch slip has to be reduced without changing the rotational speed of the primary drive again. This can be achieved by reducing the rotational speed of the shaft of the intermediate device by changing a gear (i.e., using conventional naming of the gears to a higher gear) on the disengaged and therefore passive transmission input shaft in the twin clutch transmission. After changing the gear, the clutch of the active transmission input shaft via which the rotational speed of the primary drive shaft is set is released and at the same time the clutch of the passive transmission input shaft engaged. The overlap of the two clutches occurs so that the rotational speed of the shaft of the primary drive remains unchanged.

The motor vehicle according to the invention has a device for detecting whether the motor vehicle moves in the trailing throttle mode and according to the invention, a device for varying the regulating variable regarding the intermediate device is configured to reduce the rotational speed of the shaft of the primary drive in trailing throttle mode by setting adjusting the regulating variable. In the motor vehicle according to the invention, the method according to the invention is thus implemented by the device for varying. Typically, the device for varying is a control unit. In the preferred embodiment with a twin clutch transmission, which has multiple gears this control unit is then configured to additionally effect gear changes after decreasing the rotational speed in the trailing throttle mode.

The advantages mentioned for the associated method apply in the same manner to the motor vehicle according to the invention.

BRIEF DESCRIPTION OF THE DRAWING

In the following, a preferred embodiment of the invention is described in more detail with reference to the drawing. In this preferred embodiment the intermediate device includes a 7-gear twin clutch transmission. Further, an internal combustion engine is used as primary drive. In the drawing it is shown In FIG. 1 a schematic representation of the component of a motor vehicle that are necessary for describing an exemplary embodiment of the invention and FIG. 2 multiple curves which illustrate the temporal profile of certain parameters in an exemplary embodiment of a method according to the invention, Details which are not relevant for understanding the function are not shown.

DETAILED DESCRIPTION OF PREFERRED EMBODIMENTS

Figure 1:
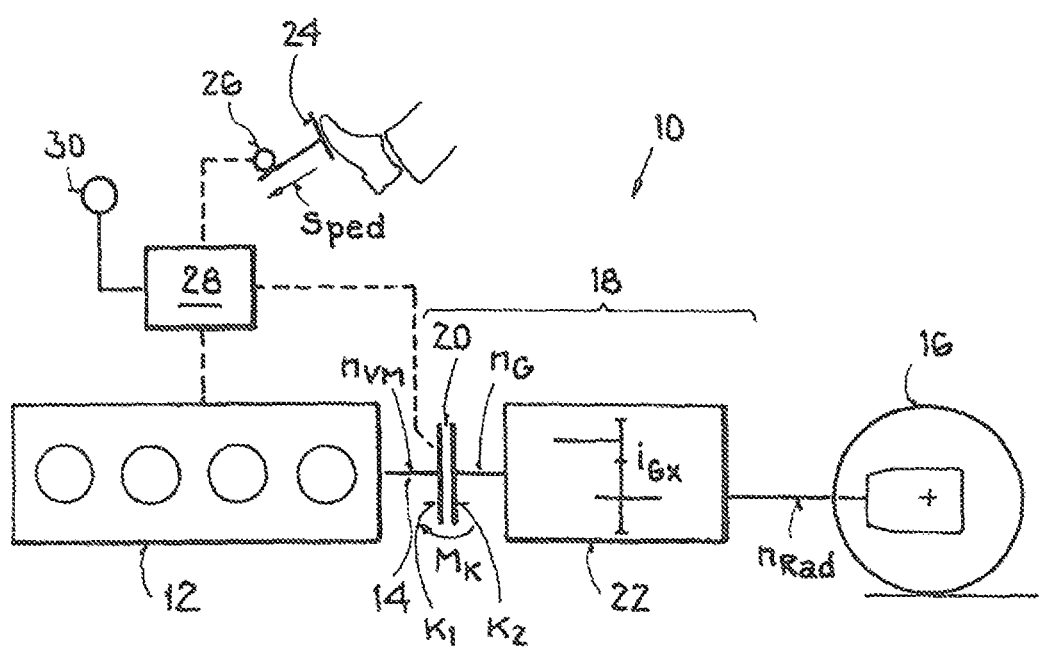

A motor vehicle, overall designated with 10, has an internal combustion engine 12, which includes a crank shaft 14 which rotates with a rotational speed $n_{VM}$. The crank shaft 14 is connected with or can be coupled with a wheel 16 of the motor vehicle via a twin clutch transmission 18. In the symbolic representation, the clutch 20 is represented by coupling discs $K_1$ and $K_2$ and the transmission 22 includes a transmission rotational speed $n_G$. The rotational speed of the wheel 16 is designated $n_{Rad}$.

In the motor vehicle 10 a gas pedal ("gas pedal") 24 is provided, upon actuation of which fuel is injected into the internal combustion engine 12. The position of the gas pedal 24 is detected by a measuring device 26 which transmits the measuring signals to a control device 28. The control device 28 causes the injection of fuel into the internal combustion engine 12 and at the same time can ensure to engage the clutch 20. The clutch 20 in the present case is adjustable, i.e. the torque $M_K$, which is transmitted via the clutch 20 can vary at otherwise constant conditions.

The control device 28 recognizes when the motor vehicle is in trailing throttle mode: the gas pedal 24 is in this case in its zero position i.e., not pressed down and the motor vehicle moves which is for example detectable by a rotational speed meter 30 on a wheel 16 of the motor vehicle (wherein the rotational speed meter 30 is shown separate from the wheel 16 in the Figure for reason of simplicity).

In the present example, the control device 28 has the purpose to operate the motor vehicle as energy efficiently as possible. In the case of a conventional trailing throttle fuel cutoff implemented in modern motor vehicles, the clutch normally remains engaged in order for the torque $M_K$ to be transmitted to the crank shaft 14, i.e. so that a traction between the wheel 16 and the internal combustion engine 12 can occur. As a result, the internal combustion engine 12 does not too closely approach standstill i.e., so hat the rotational speed $n_{VM}$ of the crankshaft 14 does not fall below a predetermined threshold value. This threshold value is selected so that an acceleration of the motor vehicle is still possible from the running operation within a relatively short time when the vehicle 10 is coasting.

Figure 2:
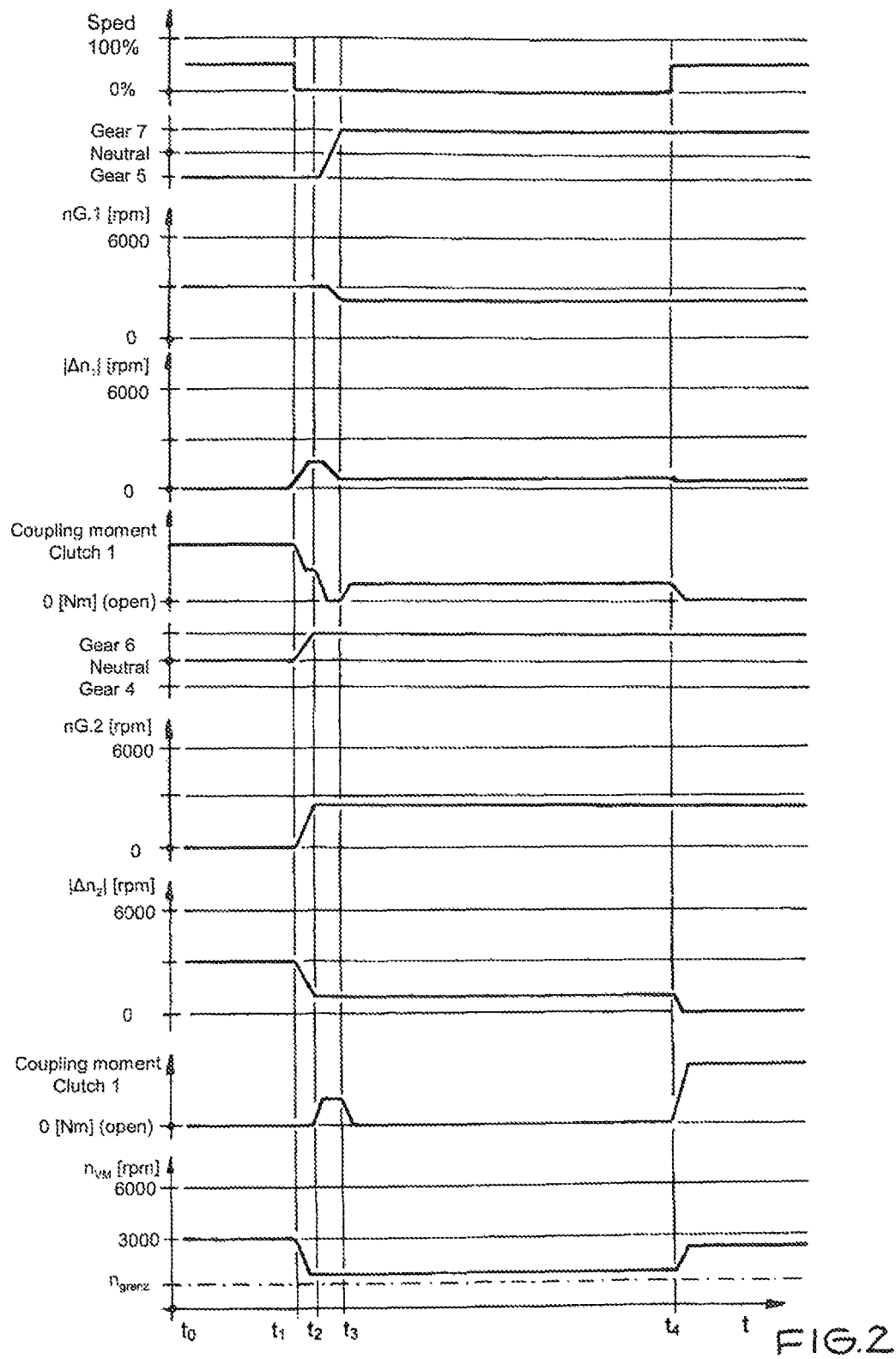

In the following, the method according to the invention is explained by way of FIG. 2:

At a time point $t_0$ the motor vehicle drives with a finite speed, wherein for the observed period of time it is assumed that this speed remains essentially constant. The position $S_{ped}$ of the gas pedal 24 in the present case is 50%.

Regarding the twin clutch transmission it is assumed that it has a first transmission gear shaft with the rotational speed $n_{G.1}$ to which the gear, setter with the gears 5 and 7 belongs. It has a second transmission input shaft, which has the rotational speed $n_{G.2}$ and the associated gear setter has the gears 4 and 6.

In the present case it is assumed that the first transmission input shaft is coupled and thus active and the fifth gear of the transmission 22 is selected. The rotational speed of the first shaft is about 3000 rpm. Because the clutch, which belongs to the transmission input shaft 1 is closed the clutch slip $\Delta n_1$ between the transmission side of the clutch and the side of the internal combustion engine is approximately zero, the rotational speeds of the two sides are thus equal. The second transmission input shaft is disengaged. This means that the clutch, which belongs to the transmission input shaft 2 is completed opened and the gear setter is neutral position between the gears 4 and 6. The rotational speed $n_{G.2}$ is approximately zero. The rotational speed of the internal combustion engine or the crankshaft 14, $n_{VM}$ is also 3000 rpm because the clutch slip $\Delta n_1$ is approximately zero.

At the time point t1 the driver moves the foot from the gas pedal 24 and the vehicle 10 assumes trailing throttle mode. Due to the relatively high rotational speed $n_{VM}$ high internal losses result in the internal combustion engine. For this reason the force with which the clutch discs $K_1$ and $K_2$ are force fittingly pushed against each other is decreased so that the transferred torque $M_K$ is lowered. Because the rotational speed of the crankshaft decreases a finite clutch slip $\Delta n_1$ results, i.e. the rotational speed $n_{VM}$ is no longer directly $n_{G.1}=i_{G5}*n_{Rad}$, wherein $i_{G5}$ is the transmission ratio of the transmission 22 for the 5. gear (inclusive possible fixed transmission ratios such as a differential). The rotational speed $n_{VM}$ of the crankshaft 14 is therefore decoupled from the rotational speed $n_{Rad}$ of the wheel 16, i.e. $n_{VM}=i_{G5}n_{Rad}-\Delta n_1$. The rotational speed of the crankshaft $n_{VM}$ is lowered by the control device 28 in particular to a value of 1000 rpm, slightly above the limit above which the control device would inject fuel for maintaining a threshold rotational speed $n_{Grenz}$.

Due to the high slip $\Delta n_1$, high internal losses result in the clutch. These can be lowered by decreasing the slip. A reduction of the slip can be achieved by a lowering of the rotational speed of the transmission side in that the transmission ratio is correspondingly changed. In the example the seventh gear is selected whereby the smallest possible rotational speed on the transmission side is established. The direct change between gears which are arranged on the same transmission input shat is however only possible by opening the clutch which belongs to the transmission input shaft so that the motor rotational speed would drop to neutral. For this reason for the change from the 5. to the 7. gear a change between sub transmission 1 and sub-transmission 2 first occurs:

First the sixth gear is selected in the sub-transmission 2 whereby the second transmission input shaft is mechanically connected with the drive shaft This results in an finite rotational speed $n_{G.2}$ of the second transmission input shaft. After the sixth gear in the second sub-transmission is selected the first clutch is opened starting at time point $t_2$ and the second clutch is closed. This occurs in a manner so that the motor rotational speed does not drop below the threshold rotational speed $n_{Grenz}$, but remains at the rotational speed of 1000 rpm. Due to the fact that the torque is now transferred via the clutch to the second transmission input shaft the slip $\Delta n_2$ is smaller than previously the slip $\Delta n_1$, because the transmission ratio of the sixth gear leads to a smaller rotational speed on the transmission side than the one of the fifth gear. The internal losses at the clutch therefore decrease. In order to further lower the clutch losses the fifth gear is then disengaged and for this the seventh gear engaged. As a result due to the different transmission ratios of the two gears 5 and 7 a lower rotational speed $n_{G.1}$ is established up to the time point $t_3$.

At the time point t3 the force transmitting dutch is then changed again so that finally the clutch sets the motor rotational speed $n_{VM}$ to the first transmission input shaft. The present clutch slip $\Delta n_1$ which is now lower than the clutch slip $\Delta n1$ between the time points $t_1$ and $t_2$ and also lower than the clutch slip $n_2$ between the time points $t_2$ and $t_3$ can not be further lowered by using different transmission ratios.

At the time point $t_4$ the gas pedal is actuated again. The driver has signaled with this that the trailing throttle mode is to be abandoned. The clutch to the first transmission input shaft is opened and the clutch belonging to the second transmission input shaft is closed. The opening of the one and closing of the other cutch occurs in the present case such that the motor rotational speed $n_{VM}$ is raised to the shaft rotational speed $n_{G.2}$ of the second transmission input shaft. The trailing throttle mode is thus terminated ($\Delta n_2=0$). Since the force transmission now completely occurs via the clutch to the second transmission input shaft the acceleration is reestablished. As an alternative the seventh gear could also be used for continuing the drive wherein then the transferring torque at the clutch to the first transmission input shaft has to be raised which leads to a lowering of the slip rotational speed. Then, an acceleration of the vehicle occurs.

In summary the internal combustion engine 12 is thus turned off by the control device 28 however it continues to rotate with a rotational speed which is reduced as far as possible in order to minimize the internal losses of the internal combustion engine. As mentioned a prerequisite is the controllability of the clutch 20: A regulating variables exists regarding the clutch 20, which determines the transferred torque $M_K$. In the case of a force fitting clutch, the regulating variable is for example the pressure with which a hydraulic cylinder pushes the one clutch disc against the other clutch disc. Other regulating variables are conceivable. The invention takes advantage of the fact that a clutch can be let slip and that this automatically occurs in the trailing throttle mode.

The invention can also be used in motor vehicles with electric drive or with other types of clutch between the drive and the wheels, for example a hydraulic transmission. It can be used in any type of non-rail bound land vehicle, which does not necessarily have to have wheels. For example the invention can be used in a motor vehicle, a utility vehicle for example an agricultural vehicle, a chain vehicle, a truck, or an automobile.

What is claimed is:
1. A method for operating a motor vehicle, comprising:
    detecting by a control device during a drive of the vehicle whether the vehicle moves in trailing throttle mode;
    when the vehicle moves in trailing throttle mode, decreasing a rotational speed of a shaft driven by a drive of the motor vehicle by automatically setting a regulating variable and
    causing an intermediate device, which couples the shaft with ground contact elements of the motor vehicle via a transmission, to assume one of multiple intermediate states between being disengaged and being fully engaged, said intermediate state being commensurate with the regulating variable, and transferring a torque between the drive and the intermediate device as a function of the intermediate state, wherein the rotational speed of the shaft and a rotational speed of the intermediate device differ from each other in the intermediate state resulting in a clutch slip;
    and after lowering the rotational speed of the shaft, reducing the clutch slip by lowering a rotational speed of an input shaft of the transmission through a change of gears.

2. The method of claim 1, wherein the rotational speed of the shaft in the trailing throttle mode is set to a predetermined value.

3. The method of claim 2, wherein the rotational speed of the shaft is adjusted by open loop control.

4. The method of claim 2, wherein the predetermined value lies above a value for the rotational speed of the shaft at which a control device of the motor vehicle would cause a consumption of energy by the drive in the trailing throttle mode.

5. The method of claim 1, wherein the drive is constructed as internal combustion engine.

6. The method of claim 5, wherein the drive has a crankshaft.

7. The method of claim 1, wherein the intermediate device comprises a clutch with or without transmission.

8. The method of claim 1, wherein the motor vehicle has a automatic twin clutch transmission.

9. The method of claim 1, wherein the ground contact elements are constructed as wheels.

10. A motor vehicle, comprising:
   a drive, in particular an internal combustion engine, having a shaft;
   an intermediate device coupling the drive with ground contact elements of the motor vehicle via a transmission;
   a device for varying a regulating variable regarding the intermediate device, said regulating variable defining a torque which is transmitted via the intermediate device; and
   a device for detecting whether the motor vehicle moves in a trailing throttle mode,
   wherein the device for varying the regulating variable is configured to automatically lower the rotational speed of the shaft in the trailing throttle mode by varying the regulating variable, thereby causing the intermediate device to assume one of multiple intermediate states between being disengaged and being fully engaged, said intermediate state being commensurate with the regulating variable, wherein a torque transferred between the drive and the intermediate device is a function of the intermediate state, and wherein the rotational speed of the shaft and a rotational speed of the intermediate device differ from each other in the intermediate state resulting in a clutch slip; and wherein said device is further configured
   after lowering the rotational speed of the shaft, reducing the clutch slip by lowering a rotational speed of an input shaft of the transmission through a change of gears.

11. The motor vehicle of claim 10, wherein the intermediate device comprises a clutch and a transmission, and wherein the ground contact elements are constructed as wheels.

12. Motor vehicle according to claim 10, further comprising a twin clutch transmission with multiple gears, characterized in that a device for varying the actuating parameter includes a control device which is configured to cause a change of gears in the trailing throttle mode after lowering the rotational speed.

* * * * *